United States Patent [19]

Goli

[11] Patent Number: 4,674,401

[45] Date of Patent: Jun. 23, 1987

[54] PROCESS AND PLANT PRODUCING HARD TACKS AND DRY BISCUITS

[76] Inventor: Maria E. Goli, Via Provinciale per il Bombone hamlet Chiusurli Troghi Rignano sull' Arno, Florence, Italy

[21] Appl. No.: 758,489

[22] Filed: Jul. 24, 1985

[30] Foreign Application Priority Data

Jul. 27, 1984 [IT] Italy .................................. 9467 A/84

[51] Int. Cl.⁴ .................................................. B01F 7/24
[52] U.S. Cl. .......................................... 99/348; 99/352; 99/353
[58] Field of Search ............. 99/348, 352, 353, 443 C; 426/560; 366/69, 71, 72, 73, 96, 97

[56] References Cited

U.S. PATENT DOCUMENTS

| | | |
|---|---|---|
| 1,345,079 | 6/1920 | Fisch ..................................... 99/353 |
| 2,709,412 | 5/1955 | Eagerman ............................. 99/352 |
| 2,897,772 | 8/1959 | Hunter .................................. 99/352 |
| 3,561,373 | 2/1971 | Sievert .................................. 99/352 |
| 4,234,605 | 11/1980 | Takeuchi ............................. 99/348 |
| 4,294,166 | 10/1981 | Takeuchi ............................. 99/348 |
| 4,322,202 | 3/1982 | Martinez ............................. 99/348 |

*Primary Examiner*—Robert W. Jenkins
*Attorney, Agent, or Firm*—Hopgood, Calimafde, Kalil, Blaustein & Judlowe

[57] ABSTRACT

The process comprises in combination the steps of: the kneading of the ingredients mostly based on flour, lard, olive-oil or anyhow vegetable oil, sugar, salt, leaven and water; a first rolling of the mixture or dough to obtain a relatively very thin layer; the leavening under this condition of thin layer, and the seasoning; a second rolling; and the baking, by previous severance and/or partial incision of the laminar leavened structure.

5 Claims, 1 Drawing Figure

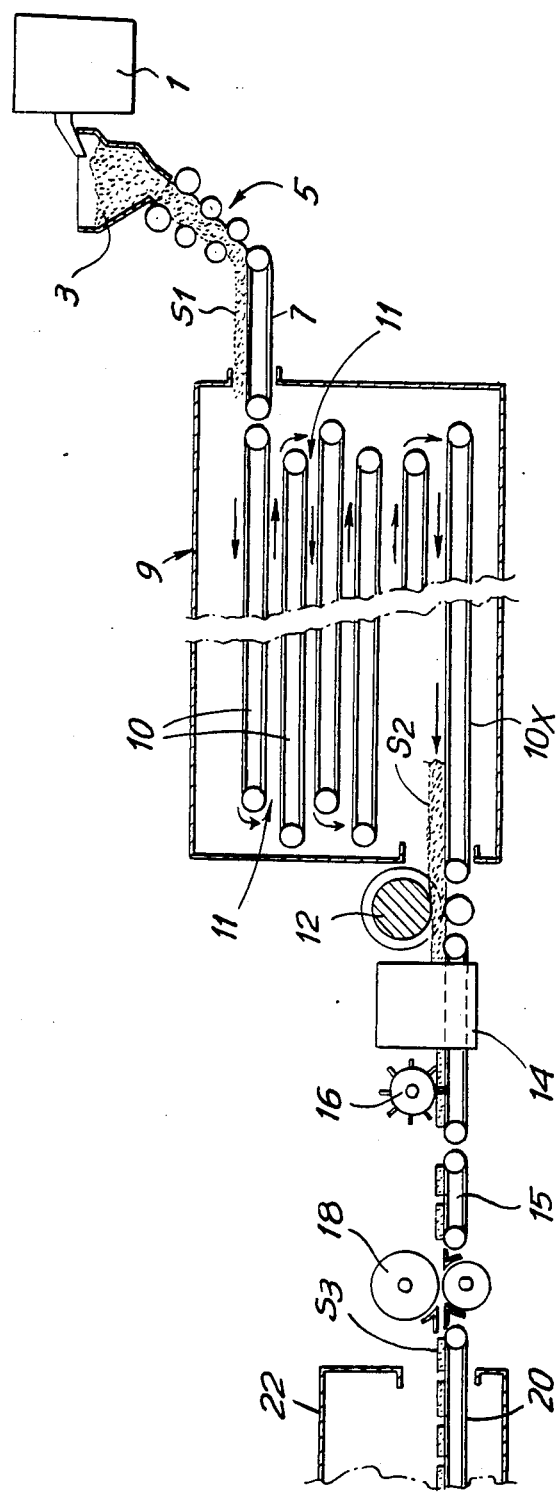

PROCESS AND PLANT PRODUCING HARD TACKS AND DRY BISCUITS

The invention relates to a process and to a plant for producing foodstuffs of the kind including hard tacks, i.e. ship's biscuits, and flat biscuits both salty and sweet, of long-lasting preservation and mostly intended for packings.

According to the invention, the working process comprises the kneading of the ingredients—mostly based on flour, lard, olive-oil or anyhow vegetable oil, sugar, salt, leaven and water—and the rolling of the mixture (or dough) in order to obtain a relatively very thin layer which is then subjected to the leavening under this condition of thin rolled layer to be fed to baking by a previous possible severance and/or incison or cutting of the laminar leavened structure.

Advantageously, the leavening step is also followed by a step including the seasoning and the formation of a slight crust at least on the surface of the rolled and leavened layer before subjecting it to the baking step in the oven. This seasoning and crust formation may be enhanced through ventilation mostly by hot air with a treatment which may last even longer than the simple leavening.

Advantageously, the rolled, leavened and eventually seasoned layer, before being subjected to the baking step, is further rolled to reduce the thickness obtained by the leavening phase; the possible crust is thus cracked and the advancement of the material accelerated to compensate for the elongation due to the further rolling treatment.

During the leavening, and eventually also during the seasoning one or more successive overturnings of the layer may be provided. The kneaded product may be delivered to the working in small pieces, to form separated pieces, or in the form of a continuous strip, this form being suitable for a more advanced mechanization.

By the rolling of the dough, which has to go to the next leavening, the dough is reduced to a layer of a thickness of about 2-3 mm, and the thickness increases up to 10-15 mm through the leavening and seasoning. The further rolling of the leavened product for its transfer to the baking may reduce the product to be baked to about 1,5 to 3 mm depending on the desired requirements of shape of the finished product to be packed.

The plant for carrying out the process according to the invention comprises, advantageously, a kneading machine, means for feeding the mixture or dough—either in continuous or in separated portions—to a rolling system, a continuous transfer system of the rolled product to effect the leavening and possibly the seasoning, a flatting unit, that is, a unit to perform a second rolling of the leavened and eventually seasoned product, and means for feeding the product to a severance or incision system and then to a baking oven. To the rolling system, individual pieces of dough may also be fed.

The continuous conveyor for the leavening and the seasoning may be advantageously developed as a set of continuous conveyors, one below the other, in order to receive the product each from the overhanging conveyor with the overturning of the product, and to make the product go through an extended path, in the course of which the leavening and the seasoning take place. Scrapers may be provided to make easier the detachment and overturning. To speed up the leavening and achieve the seasoning, the conveyors set may be housed in an environment surrounded by one, two or more chambers to effect a treatment of heat conditioning and even ventilation by hot air or other therein, particularly for the seasoning and the formation of the crust.

The overturning gives rise to the formation of crust on both sides.

The invention is illustrated by a non limitative embodiment of it.

In the drawing there is shown, very schematically, a plant for carrying out the present process.

According to what is illustrated in the drawing, by 1 there is indicated a kneading machine, which is apt to discharge the mixture or dough—in a continuous or discontinuous way—into a hopper 3 which feeds the dough to a rolling system 5 having rollers or the like, in order to reduce the dough just formed and not yet leavened, to a relatively very thin layer S1, about 2-3 mm thick. The dough will be typically a mixture of flour, fats (especially lard and olive-oil), sugars, salt, leaven, water and other. The layer S1 is fed by a conveyor 7 into a leavening and seasoning cell 9 where it is then laid down onto conveyors 10 which are each capable of receiving the layer in transit from the overhanging conveyor. The last 10X of the conveyors 10 feeds the leavened layer S2 to a second rolling system 18. This system 18 performs a cut and severance operation, mostly by means of two successive rotors 12 and 16 for the trasversal and longitudinal cut, and by means of two trasversal retractors 14 (of springs type or other) and a longitudinal retractor 15. The product then reaches a conveyor 20, which conveys it through the baking oven 22. At the end of the working path of each conveyor, or, at least, of the first conveyor, a scraper 11 is provided which ensures the detachment of the layer from the conveyor.

In the unit 9, 10 the rolled product is subjected to the leavening process, that is, to the rising and next seasoning process as well as a partial surface drying, owing to the dwell in the cell 9 and to a heat conditioning and/or ventilation treatment at a temperature preferably higher than the room temperature. The dwell in the cell 9, with a slow transit on the conveyors 10, may last—in one or a plurality of subsequent cells—till in the range of about 2 hours; during the first 30-35 minutes the leavening step is completed and the product may reach the thickness of 10-15 mm; the product is then subjected to the seasoning and gives rise to the formation of slight surface crusts on either faces of the layer.

The layer S2, leavened and seasoned in this way, is subjected to the cut, spacing and flatting in the second rolling mill 18, until it is reduced to a layer S3 again of about 1,5-3 mm thick or anyhow to a thickness which roughly corresponds to the desired thickness of the finished and baked product; the layer S3 is transferred from the conveyor 15 at a speed higher than that of arrival, to compensate for the elongation due to rolling and to ensure the longitudinal spacement.

After the cut or at least the incision, the product is subject to the baking in the oven 22. In the oven 22 there may be scheduled a baking time in the range o 10-20 minutes. The baked pieces result, in any case, slightly spaced between them.

It should be understood that what has been illustrated and described is only one, non limitative embodiment of the invention. Obviously, a similar plant may be employed to carry out the operations on separated portions of dough being loaded on a conveyor which feeds them to a rolling mill from which the rolled portions reach the cell 9.

I claim

1. A plant for the production of hard tacks and dry biscuits, comprising a kneading mechine, transfer means and a baking oven; said transfer means comprising:
   a. a first system of driven rolls for continuously reducing to a predetermined uniform thickness the kneaded-dough output of the kneading machine;
   b. means establishing a leavening zone;
   c. continuously driven transfer means operative upon the uniform-thickness product of the roll system for transferring rolled product through the leavening zone, said transfer means having such effective length for its transfer speed as to effect leavening in the leavening zone in the course of continuous transferring displacement while in the leavening zone, whereby leavened product emerging from the leavening zone is of expanded substantially uniform thickness; and
   d. a second system of continuously driven rolls operative upon the leavened product for reduction of the leavened product to a predetermined uniform thickness in the course of delivery of leavened product to the baking oven.

2. The plant of claim 1, in which within said leavening zone said transfer means comprises a set of vertically spaced horizontally elongate continuous conveyors, vertically adjacent conveyors being driven in opposite directions whereby, in the course of leavening, the product will be overturned for each supported dwell in a different conveyor.

3. The plant of claim 1, in which the means which establishes the leavening zone also establishes a seasoning zone.

4. A plant for the production of hard tacks and dry biscuits, comprising a kneading machine, transfer means and a baking oven; said transfer means comprising:
   a. a system of driven rolls for continuously reducing to a predetermined uniform thickness the kneaded-dough output of the kneading machine;
   b. means establishing a leavening zone;
   c. continuously driven transfer means operative upon the unifor-thickness product of the roll system for transferring rolled product through the leavening zone, said transfer means having such effective length for its transfer speed as to effect leavening in the leavening zone in the course of continuous transferring displacement while in the leavening zone; whereby leavened product emerging from the leavening zone is of expanded substantially uniform thickness; and
   d. a system for the severance or incision operative upon the leavened product in the course of delivery of leavened product to the baking oven.

5. The plant of claim 4, in which a second system of continuously driven rolls is operative upon the leavened product in the course of delivery of leavened product to the baking oven.

* * * * *